United States Patent [19]

Firey

[11] Patent Number: 5,109,808

[45] Date of Patent: May 5, 1992

[54] CROSS FLOW PRIMARY REACTORS FOR CYCLIC CHAR BURNING ENGINES AND GASIFIERS

[76] Inventor: Joseph C. Firey, P.O. Box 15514, Seattle, Wash. 98115-0514

[21] Appl. No.: 725,823

[22] Filed: Jul. 3, 1991

[51] Int. Cl.⁵ .............................................. F02B 45/02
[52] U.S. Cl. ...................................................... 123/23
[58] Field of Search ................. 123/1 R, 3, 23; 60/39, 60/12, 464

[56] References Cited

U.S. PATENT DOCUMENTS

| | | | |
|---|---|---|---|
| 4,653,436 | 3/1987 | Firey | 123/23 |
| 4,865,623 | 9/1989 | Firey | 123/23 |
| 5,002,024 | 3/1991 | Firey | 123/23 |

Primary Examiner—Noah P. Kamen

[57] ABSTRACT

Reacted gas reservoirs and reactant gas manifolds are added to primary reactors of cyclic char burning engines and gasifiers in order to create a flow of gas across the direction of motion of the solid char fuel. A larger and more stable rapid char fuel primary reaction zone can be created with this cross flow, and improved utilization of char fuel volatile matter can be achieved.

31 Claims, 5 Drawing Sheets

CROSS FLOW PRIMARY REACTORS FOR CYCLIC CHAR BURNING ENGINES AND GASIFIERS

CROSS REFERENCE TO RELATED APPLICATIONS

This invention is related to my following U.S. Patent applications:

1. *Several Flow Passages With Different Connection Places For Cyclic Solid With Gas Reactors*, Ser. No. 07/468,121, filed Jan. 22, 1990.
2. *Improved Starting Means For Char Burning Engines*, Ser. No. 07/633,256, filed Dec. 21, 1990.
3. *Two Or More Flow Passages With Different Connection Places For Cyclic Solid With Gas Reactors*, a continuation-in-part from above Ser. No. 07/468,121, filing receipt not yet received.

SUMMARY OF THE INVENTION

Within the primary reactor of a cyclic char burning engine or gasifier flow of reactant air across the direction of motion of the char fuel is achieved. An air manifold is added with ports along the side of the primary reactor, these ports connecting into preferably the full length of the char fuel motion path so that air enters one or more sides of the primary reactor distributed along the length of this motion path. One or more primary reacted gas reservoirs are added with ports on the opposite side of the primary reactor these ports connecting into portions of the length of the char fuel motion path. For the producer gas reservoir the ports connect into the high temperature rapid reaction zone portion of the char fuel motion path where air is reacting with char fuel carbon to form producer gas. This producer gas then flows via these ports into the producer gas reservoir and is stored therein during the compression process. In this way the flow of air into and producer gas out of the primary reactor is in large part across the direction of motion of the char fuel through the primary reactor during compression.

During expansion the stored producer gas can reverse flow direction and flow out via the rapid reaction zone into the air manifold and thence into the variable volume chamber of the compressor and expander. Alternatively changeable gas flow connections can be used between the producer gas reservoir and the variable volume chamber so that producer gas flows directly into the variable volume chamber during expansion and does not reverse flow direction. Additional changeable gas flow connections can be used between the variable volume chamber and the air manifold so that gas flow through the air manifold, the primary reaction chamber, and the producer gas reservoir is unidirectional during both compression and expansion.

When high volatile matter char fuels, such as bituminous coal, are used this volatile matter is distilled out of the coal in the first preheat and volatile matter distillation, portion of the char fuel motion path. For these coals a volatile matter in air mixture reservoir is added to the primary reactor with ports into this preheat and volatile matter distillation zone and opposite the ports from the air manifold. During compression air flows into the preheat and volatile matter distillation zone and mixes into the emerging volatile matter to form a volatile matter-in-air mixture which then flows into the volatile matter-in-air reservoir to be stored therein. In this way the flow of air into and volatile matter-in-air mixture out of the primary reactor is in large part across the direction of motion of the char fuel through the primary reactor during compression. Further the volatile matter-in-air mixture and the producer gas are largely separated in the two separate reservoirs.

As described above for the producer gas reservoir the flow of the volatile matter-in-air mixture out of its reservoir during expansion can also be unidirectional, in whole or part, by use of changeable gas flow connections, or can be reversed when such changeable gas flow connections are not used.

Tar reduction by mixing air into emerging coal volatile matter can be achieved by use of this invention without appreciable burnup of the volatile matter-in-air mixture since this mixture passes largely into the volatile matter-in-air reservoir and only small portions may enter the high temperature rapid reaction zone. In this way carbon dioxide formation is avoided and an excessively large primary reaction chamber is not required. Also excessive temperatures from burnup of volatile matter-in-air mixture and consequent ash fusion with clinker formation are also avoided. These are among the beneficial objects made available by the devices of this invention.

The producer gas reservoir can be fitted with a particle separator means and the ash particles can then be allowed to carry over into the producer gas reservoir. Ash removal from the producer gas reservoir is simpler than from the ash collection end of the primary reactor since whatever is collected in the producer gas reservoir can be removed as ashes without concern for removing unburned char fuel from the primary reactor. Similar particle separator means can also be used in the volatile matter in air mixture reservoir to separate such tar particles as are formed and these can then be removed by an ash removal type of mechanism. These are additional beneficial objects made available by the devices of this invention.

BACKGROUND OF THE INVENTION

1. Field of the Invention

This invention is in the field of cyclic char burning engines and gasifiers wherein the cycle of compression followed by expansion is created by a combined compressor and expander means such as a piston and cylinder type of internal combustion engine mechanism.

2. Description of the Prior Art

Examples of prior art cyclic char burning engines and gasifiers are described in the following U.S. Patents:
U.S. Pat. No. 4,372,256; J. C. Firey, Feb. 8, 1983
U.S. Pat. No. 4,412,511; J. C. Firey, Nov. 1, 1983
U.S. Pat. No. 4,653,436; J. C. Firey, Mar. 31, 1987
U.S. Pat. No. 4,794,729; J. C. Firey, Jan. 3, 1989.

In these example cyclic char burning engines and gasifiers air, or other reactant gas containing appreciable oxygen gas, is compressed into the pore spaces of a solid char fuel, contained within a separate primary reaction chamber, during a compression process and this is followed by expansion of the primary reacted gases, formed by reaction of oxygen with the char fuel, out of the pore spaces of the char fuel during an expansion process. This cycle of compression followed by expansion is repeated. This cycle of compression and expansion is created by a combined means for compressing and expanding, such as a piston operated within a cylinder, wherein the space enclosed by the piston crown and the cylinder walls is a variable volume chamber whose volume varies cyclically when the piston is reciprocated by an internal combustion engine mechanism for driving this combined means for compressing and expanding. Following each expansion process the reacted gases are largely removed from the variable volume chamber by an exhaust means. Fresh air is next supplied into the variable volume chamber by an intake means prior to the next following compression process. Thus an exhaust process followed by an intake process is interposed between each expansion process and the next compression process for a cyclic char burning engine or gasifier as is well known in the art of internal combustion engines. Each compression process occupies a compression time interval which is followed by an expansion process occupying an expansion time interval. The separate primary reaction chamber is contained within a pressure vessel container. A means for preheating the char fuel within the primary reaction chamber is used to bring the char fuel up to that temperature at which it will react rapidly with oxygen in adjacent compressed gases while the engine or gasifier is being started. Thereafter the means for preheating the char fuel can be turned off when the heat of the primary reaction becomes sufficient to keep the char fuel at or above this rapid reaction temperature. During starting a cranking means is used to drive the internal combustion engine mechanism. The detailed descriptions of cyclic char burning engines and gasifiers contained in the above listed U.S. Patents are incorporated herein by reference thereto.

The term char fuel is used herein and in the claims to include highly carbonaceous and largely solid fuels such as coal, coke, charcoal, petroleum coke, etc.

As char fuel is reacted to ashes within the primary reactor it is replaced by a refuel mechanism means for supplying fresh char fuel into a refuel end of the primary reactor. The char fuel is thus moved along through the primary reactor toward an opposite ash collection end of the primary reactor. Hence the char fuel being reacted within the primary reactor has a direction of motion from the refuel end toward the ash collection end. An ash removal mechanism is used as a means for removing ashes from the primary reaction chamber.

Where air is the reactant gas it is readily available from the atmosphere. In some applications oxygen enriched air or essentially pure oxygen may be used as the reactant gas, as for example in some gasifier uses, and here a source of oxygen rich gas is needed.

The term producer gas is used herein and in the claims to mean those reacted gases emerging from the primary reactor during expansion and this is normally a fuel gas containing carbon monoxide and other components.

The term secondary reacted gas is used herein and in the claims to mean those reacted gases within the secondary reactor, and for engines these are normally essentially complete combustion products containing carbon dioxide and other components.

In engine applications of cyclic char burning engines and gasifiers the variable volume chamber is also a secondary reaction chamber comprising an igniter means for burning the primary reacted gases with secondary air during the expansion process. The needed secondary air is retained outside the char fuel primary reactor during compression. In gasifier applications of cyclic char burning engines and gasifiers no secondary air is thusly retained and thus the variable volume chamber is not a secondary reaction chamber. Hence for cyclic char burning gasifiers the final reacted gas during expansion is the producer gas product from the primary reactor. For both a cyclic char burning engine and a cyclic char burning gasifier network output can be done on the piston, since both the primary and secondary reactions are exothermic and are carried out under varying pressures of the cycle. Herein and in the claims the term power reactor is used to mean either a cyclic char burning engine or a cyclic char burning gasifier.

The term fixed open gas flow connection is used herein and in the claims to mean a gas flow passage which remains open whenever the cyclic char burning engine or gasifer is operating.

The term changeable gas flow connection is used herein and in the claims to mean a gas flow passage which can be opened or closed while the cyclic char burning engine or gasifier is operating. A changeable gas flow connection is opened and closed by a means for opening and closing and this is driven from the internal combustion engine mechanism drive means as is well known in the art of internal combustion engines.

As the char fuel, within the primary reactor, moves along the char fuel motion direction it is preheated by heat transfer from char fuel portions which are further along and are reacting rapidly with oxygen and thus are at a high temperature. Where the char fuel being used is essentially free of volatile matter, as with coke fuel, this preheat zone serves to bring the new char fuel up to its rapid reaction temperature. The char fuel then enters the rapid reaction zone and carbon reacts therein with oxygen to form producer gas. Beyond the rapid reaction zone in the direction of char fuel motion the char fuel is essentially completely reacted to ashes which pass into an ash collection zone at the end of the char fuel motion path.

When the char fuel being used contains volatile matter, as with bituminous coal, the preheat zone also serves to remove the volatile matter from the coal, in part by distillation and in part by reaction to volatile products. In the absence of oxygen appreciable portions of this distilled volatile matter become tars and other portions become fuel gases of essentially hydrocarbon type. These tars from coal volatile matter are undesirable in a cyclic char burning engine or gasifier as they tend to clog up the mechanical components of the internal combustion engine mechanism and to foul any spark igniters used in the secondary reactor. Tars which are exhausted from the cyclic char burning engine or gasifier are also an undesirable air pollutant material.

In prior art, steady pressure, gas producers tar formation from coal volatile matter has been successfully reduced by passing the primary reactant air first into the preheat and volatile matter distillation zone. The emerging volatile matter apparently reacts with oxygen in the air to form oxygenated hydrocarbon type materials which form much less tar. The resulting volatile matter-in-air mixture then passes into the rapid reaction zone. Within the rapid reaction zone the volatile matter-in-air mixture is apparently burned in appreciable part to fully reacted carbon dioxide and steam. The carbon dioxide and steam, plus any unreacted oxygen, then react with carbon in the rapid reaction zone to form producer gas which emerges from the primary reactor. One disadvantage of this method for reducing tar formation is that the initial burning of the volatile matter in air mixture on entering the rapid reaction zone creates very high temperatures there and ash fusion and clinkering may result. These clinkers clog up the motion of the char fuel along the char fuel motion direction and may encase carbon particles and thus prevent complete carbon gasification. Another disadvantage of this method for reducing tar formation is that the carbon dioxide and steam created by burnup of the volatile matter-in-air mixture, react much more slowly with hot carbon in the rapid reaction zone to form producer gas. In prior art, steady pressure, gas producers this latter disadvantage was overcome by use of deeper rapid reaction zones of larger cross sectional area so that the required producer gas reaction could be completed. But when primary producer gas reactors are to be used on cyclic char burning engines or gasifiers such large volume reactors cannot be used since engine compression ratio would be greatly reduced and power producing efficiency also greatly reduced. It would be very desirable to have available a method for reducing tar formation from high volatile matter char fuels which did not produce clinkers and did not require a large volume primary reactor.

In prior art cyclic char burning engines and gasifiers the ashes are removed from the ash collection zone of the primary reactor at the end of the char fuel motion path by an ash removal mechanism. Most such ash removal mechanisms remove a volume of material at intervals and it is necessary to control either the volume, or the interval, or both, so that only ashes, and no unburned char fuel, are removed. While such control means are feasible they are necessarily complex since it is difficult to sense the ash quantity and ash level existing within the ash collection zone. It would be desirable to have available an ash removal means which did not require such sensing of ash level within the primary reactor.

DESCRIPTION OF THE PREFERRED EMBODIMENTS

Figure 1:
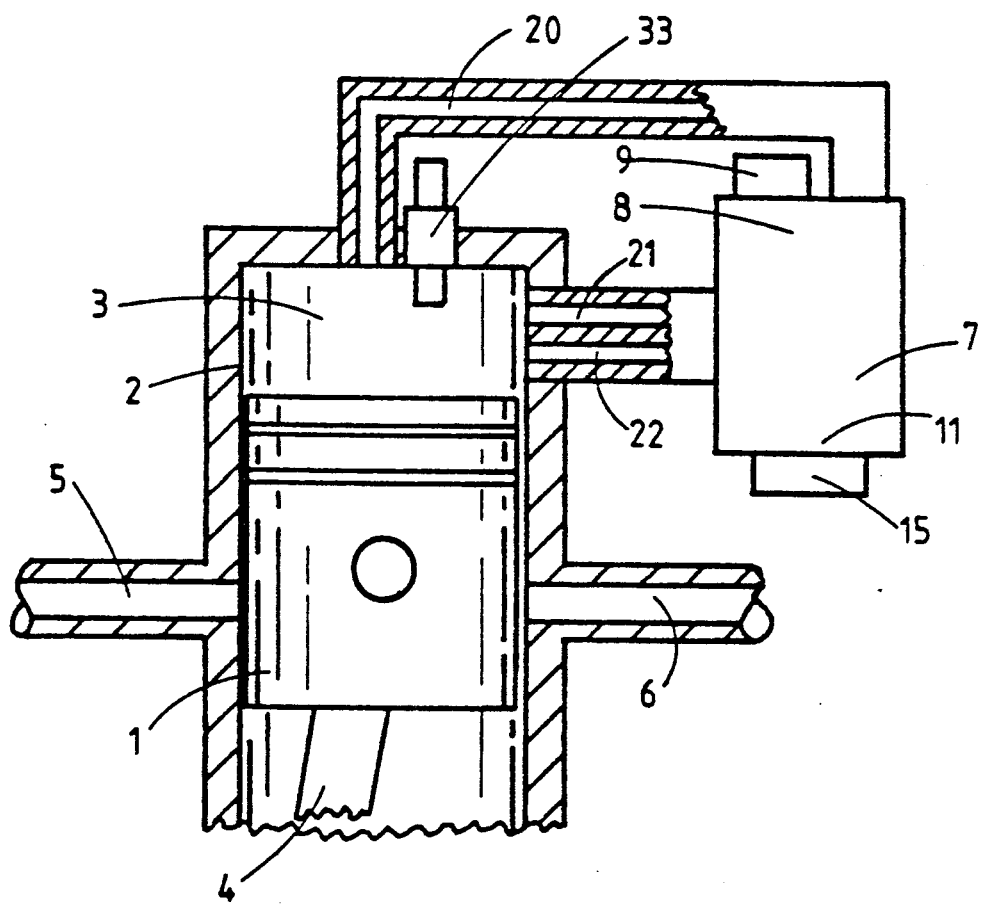
FIG. 1 is a first embodiment of the invention.
Figure 2:
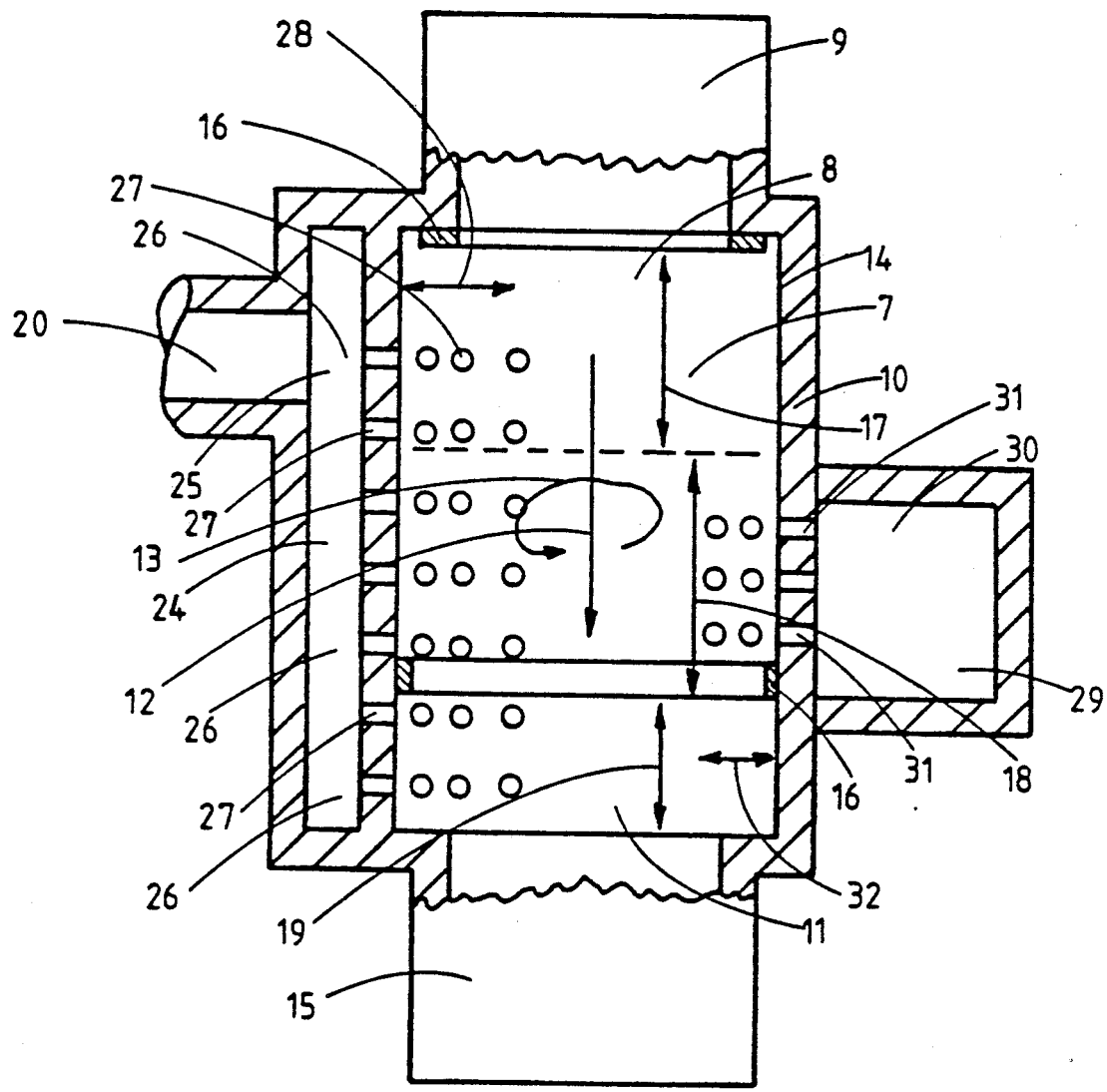
FIG. 2 is a detailed view of the reaction chamber for FIG. 1.

All forms of this invention are improvements to cyclic char burning engines or gasifiers using a separated primary reaction chamber, an example of which is shown schematically in FIGS. 1, and 2, and comprises:

1. A combined means for compressing and expanding gases comprising: a piston, 1; operative within a cylinder, 2; and these enclosing a variable volume chamber, 3; whose volume varies cyclically as the piston is reciprocated by a drive means, 4, only the connecting rod of which is shown in FIG. 1. The drive means, 4, reciprocates the piston, 1, thus varying the volume of the variable volume chamber, 3, creating a compression process for a compression time interval when the piston, 1, is rising and decreasing the volume of the variable volume chamber, 3, and creating an expansion process for an expansion time interval when the piston, 1, is descending and increasing the volume of the variable volume chamber, 3. The combined means for compressing and expanding shown in FIG. 1 further comprises: an intake means, 5, for placing air as reactant gas into the variable volume chamber, 3, prior to each compression process when the piston, 1, is at the bottom portion of its stroke; an exhaust means, 6, for removing reacted gases from the variable volume chamber, 3, after each expansion process when the piston, 1, is again at the bottom portion of its stroke. A two stroke cycle internal combustion engine mechanism is shown in FIG. 1 but four stroke cycle internal combustion engine mechanisms can also be used. Also drive means other than the crank and connecting rod mechanism of FIG. 1 can also be used such as the Wankel engine mechanism.

2. A separated primary reaction chamber, 7, contains char fuel which is added into the refuel end, 8, thereof by a refuel mechanism, 9, and this primary reactor comprises: a pressure vessel container, 10, to contain the primary reaction chamber, 7; an ash collection end, 11; a char fuel direction of motion, 12, from the refuel end, 8, toward the ash collection end, 11 in which direction the char fuel moves as it is being reacted and consumed within the primary reactor, 7; a peripheral dimension, 13, around the inner surface, 14, of the primary reactor 7, at right angles to the char fuel motion direction, 12; an ash removal mechanism, 15, which in this FIGS. 1 and 2 example removes ashes from the ash collection end, 11, of the primary reactor, 7; a starting heater means, 16, for preheating the char fuel in the primary reactor, 7, up to that temperature at which it reacts rapidly with oxygen in adjacent compressed reactant gas when the engine is being started, electrodes, 16, being used to pass a heating electric current directly through the char fuel itself in the example starting heater shown in FIG. 2.

3. The fresh char fuel refueled into the refuel end, 8, of the primary reactor, 7, is cold, and will not react with compressed air, but is heated by conduction from those char fuel portions deeper into the primary reactor which are at a high temperature and are reacting rapidly with oxygen to create producer gas. Thus the first portion, 17, of the primary reaction chamber along the char fuel motion direction, 12, is a char fuel preheat zone, 17, and distillation of volatile matter takes place here also when char fuels containing volatile matter are being used. At the end of the preheat and volatile matter distillation zone, 17, the char fuel is at or above its rapid reaction temperature and enters the rapid reaction zone portion, 18, of the primary reaction chamber along the char fuel motion path, 12, where char fuel reacts rapidly with oxygen in adjacent compressed reactant gases to create a producer gas product, and the heat of this reaction maintains the rapid reaction zone at or above the char fuel rapid reaction temperature. Within the rapid reaction zone, 18, of the char fuel reactor, 7, the carbon of the char fuel is gasified to producer gas and leaves only the ashes which collect in the ash zone, 19, at the ash collection end, 11, of the char fuel motion path, 12.

4. Various means for connecting the primary reaction chamber, 7, to the variable volume chamber, 3, of the combined compressor and expander can be used for this invention. A single fixed open gas flow connection, 20, is shown in the particular example of FIG. 2, and thus gas flows from the variable volume chamber, 3, via this connection, 20, into the primary reactor, 7, during compression, and this flow direction is reversed during expansion. Other connecting means may use several other separate connecting means, 21, 22, between the primary reactor, 7, and the variable volume chamber, 3, as shown in FIG. 1, and as described hereinbelow.

The devices of this invention comprise additions to the separate primary reaction chamber, 7, of the cyclic char burning engines or gasifiers as described hereinabove as follows:

5. A reactant gas manifold, 24, is added whose inlet, 25, connects to the variable volume chamber, 3, of the combined compressor and expander via the connection, 20. The outlet, 26, of the reactant gas manifold, 24, connects to several ports, 27, into the primary reaction chamber, 7. These reactant gas ports, 27, are positioned along at least that portion of the length of the char fuel motion path, 12, through the primary reactor, 7, which is adjacent to the rapid reaction zone, 18, and are positioned around an inlet portion, 28, of the peripheral dimension, 13, of the primary reactor. In some applications of this invention these reactant gas ports, 27, are positioned along essentially the whole length of the char fuel motion path, 12.

6. A producer gas reservoir, 29, is added whose inlet, 30, connects to several ports, 31, into the primary reaction chamber, 7. These producer gas ports, 31, are distributed along that portion, 18, of the char fuel motion path, 12, adjacent to the rapid reaction zone of the char fuel, and are positioned around an outlet portion, 32, of the peripheral dimension, 13, of the primary reactor, 7.

7. The producer gas ports, 31, are preferably located on the side of the primary reactor opposite the reactant gas ports, 27, and any remaining portions of the primary reactor peripheral dimension, 13, are sealed and unported.

8. The producer gas ports, 31, and also the reactant gas ports, 27, preferably have at least one area cross section dimension which is smaller than the char fuel particles being refueled into the primary reactor, 7. These ports can be of various shapes such as round holes or slots.

The operation of the particular example of this invention shown schematically in FIG. 1 and FIG. 2 is as follows:

1. When the cyclic char burning engine or gasifier of FIG. 1 is to be started, an electric current is passed through the char fuel in the primary reactor, 7, via the electrodes, 16, which heats up the char fuel to its rapid reaction temperature. The internal combustion engine mechanism drive means, 4, is then cranked by a cranking means for starting and cycles of compression followed by expansion are created within the variable volume chamber, 3. Prior to each such compression air as reactant gas is placed inside the variable volume chamber, 3, by the intake means, 5. Following each such expansion reacted gas is removed from the variable volume chamber, 3, by the exhaust means, 6.

2. During compression compressed air flows from the variable volume chamber, 3, via the fixed open gas flow connection, 20, into the reactant gas manifold, 24, and thence via the reactant gas ports, 27, into and across the primary reaction chamber, 7. Within the rapid reaction zone, 18, air reacts rapidly with hot char fuel to form producer gas which flows via the producer gas ports, 31, into the producer gas reservoir, 29. Producer gas is thus stored during compression within the producer gas reservoir, 29, as well as within the pore spaces of the rapid reaction zone, 18.

3. During expansion producer gas flows out of the producer gas reservoir, 29, reaction zone, 18, into the reactant gas manifold, 24, via the reactant gas ports, 27, and into the variable volume chamber, 3, via the gas flow connecting means, 20. For this FIG. 1 and FIG. 2 form of the invention the gas flow direction during expansion is thus the reverse of the flow direction during compression. The gas flows in considerable part also across the direction of motion, 12, of the char fuel through the primary reactor, 7.

4. Where the cyclic char burning unit is an engine, secondary air may be retained within the variable volume chamber, 3, and mixed with the producer gas flowing thereinto during expansion to create a combustible mixture which can be ignited by a spark or other igniter means, 33.

Essentially complete combustion of the producer gas in air can thus be achieved by a secondary reaction within the variable volume chamber, 3, and work is produced by this engine cycle of compression, reaction, and expansion. In this engine case the variable volume chamber, 3, thus becomes also a secondary reaction chamber.

5. This cycle of intake, compression, reaction, expansion and exhaust is repeated. The starting heater means, 16, is turned off when the heat of the primary producer gas reaction within the primary reactor, 7, is sufficient to maintain the char fuel at its rapid reaction temperature within the rapid reaction zone, 18. The cranking means for starting is turned off when the network of the cycle is sufficient to keep the engine running.

6. With the scheme of this invention shown in FIG. 2 air enters the rapid reaction zone, 18, from above, from the side, and from below via the ash collection zone, 19. A large and stable rapid reaction zone is thusly created by this ready air access thereto. Additionally those air portions passing through the ash collection zone, 19, are preheated therein, in part by conduction from the hot ash particles, and in part by final burnup of any carbon reaching the ash collection zone. This preheated air elevates the char fuel temperature in the rapid reaction zone. In these ways full char fuel burnup is obtained, a large and stable rapid reaction zone is created some of whose air supply is preheated and these are among the beneficial objects made available by use of the schemes of this invention.

Figure 5:
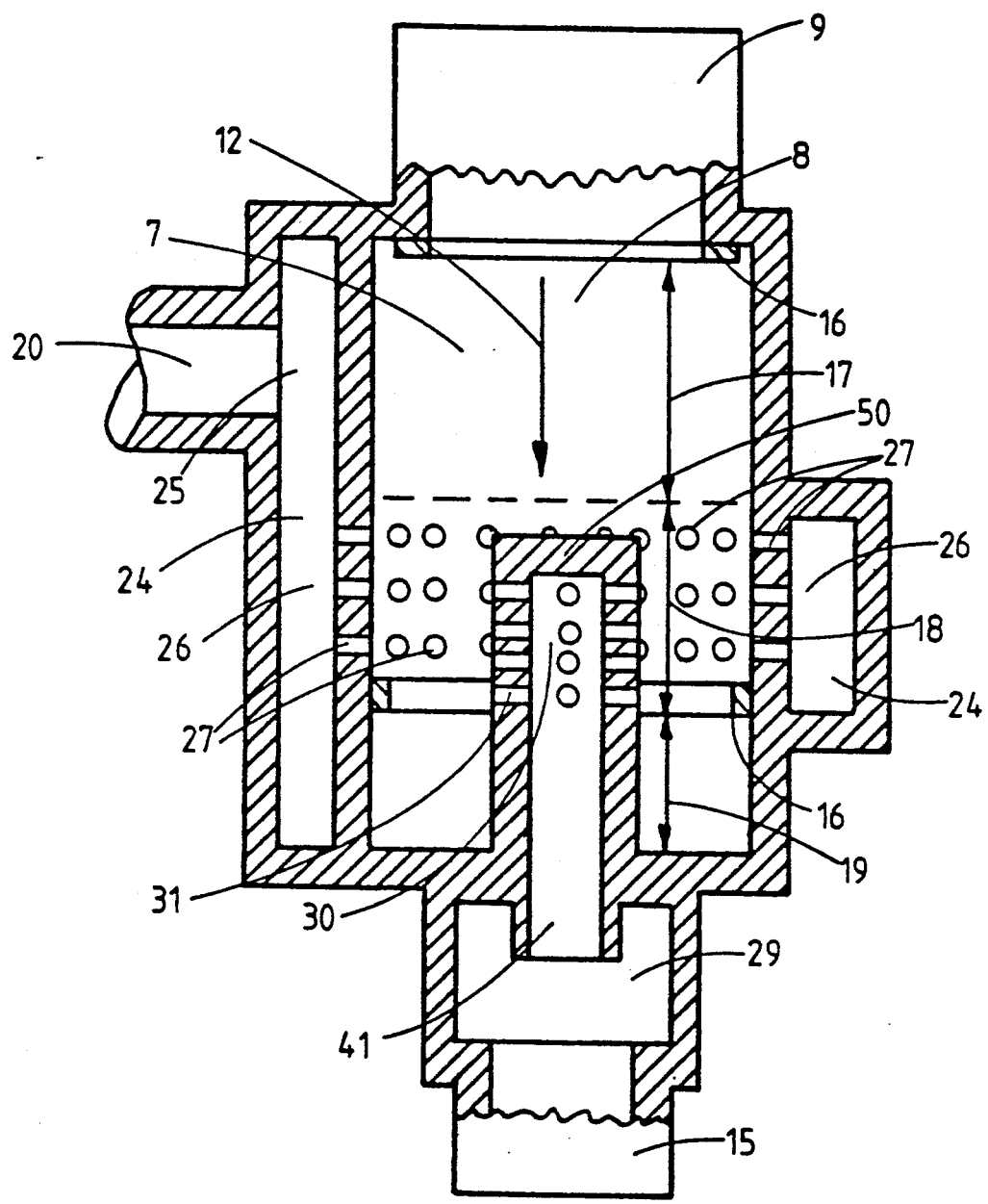
FIG. 5 is a fourth embodiment of the reaction chamber.

Another form of this invention, similar to the form shown in FIG. 2, is shown in FIG. 5 wherein the inlet, 30, to the producer gas reservoir, 29, is positioned radially centrally within the ash collection zone, 19, and the rapid reaction zone, 18. The producer gas outlet ports, 31, are positioned along the length of the primary reaction chamber, 7, in the direction of char fuel motion, 12, which is adjacent to the rapid reaction zone, 18. These producer gas ports, 31, can be positioned angularly uniformly around the periphery of the inlet, 30, and are at right angles to the char fuel motion direction, 12, so that fuel particles will not tend to be pushed through these producer gas ports. With this centrally positioned inlet to the producer gas reservoir, 29, ash particles will carry over through the ports, 31, into the reservoir, 29, and the ash removal mechanism, 15, is thus positioned to remove ashes collected in the producer gas reservoir, 29. Preferably that portion of the reactant gas manifold, 24, outlet, 26, with reactant gas ports, 27, into the rapid reaction zone, 18, uses as an inlet portion of the periphery of the primary reaction chamber, 7, essentially the full periphery so that the reactant gas manifold, 24, wraps fully around the primary reactor, 7, adjacent to the rapid reaction zone. In this way air, as reactant gas, flows radially across the direction of char fuel motion, 12, essentially angularly uniformly and the resulting producer gas exits from the central positions of the rapid reaction zone. With this radial cross flow pattern the char fuel volume in the rapid reaction zone which receives unreacted air is increased. The top, 50, of the inlet, 30, to the producer gas reservoir, 29, is capped to prevent char fuel entering therein and thus bypassing the rapid reaction zone, 18.

In addition to the foregoing elements, as described hereinabove, additional elements and modified elements can be used for various forms of this invention.

When the char fuel being used contains appreciable volatile matter, as for example in bituminous coal, an additional separate volatile matter in air mixture reservoir with ports connected into the preheat and volatile matter distillation zone may be preferred. One particular example of such a volatile matter in air mixture reservoir and ports form of this invention is shown schematically in FIG. 3 and comprises:

1. The separate primary reaction chamber, 7, with refuel end, 8, refuel mechanism, 9, pressure vessel container, 10, ash collection end, 11, char fuel motion direction, 12, peripheral dimension, 13, char fuel preheat and volatile matter distillation zone, 17, rapid reaction zone, 18, ash zone, 19, connection, 20, to the variable volume chamber, 3, reactant gas manifold, 24, reactant gas inlet ports, 27, producer gas reservoir, 29, producer gas ports, 31, is essentially similar to that described hereinabove for the FIG. 2 form of this invention. For this form of the invention using a volatile matter in air mixture reservoir the reactant gas inlet ports, 27, are preferably positioned along essentially the whole length of the char fuel motion path, 12, through the primary reactor, and are at least positioned adjacent to the volatile matter distillation and preheat zone, 17.

2. A volatile matter in air mixture reservoir, 34, is added whose inlet, 35, connects to several ports, 36, into the primary reaction chamber, 7. These volatile matter in air mixture ports, 36, are distributed along that portion, 17, of the char fuel motion path, 12, adjacent to the preheat and volatile matter distillation zone of the char fuel, and are positioned around an outlet portion of the peripheral dimension, 13, of the primary reactor, 7.

3. The volatile matter in air mixture ports, 36, are preferably located on the side of the primary reactor, 7, opposite the reactant gas ports, 27, and these ports also have at least one area cross section dimension which is smaller than the char fuel particles being refueled into the primary reactor, 7.

Figure 3:
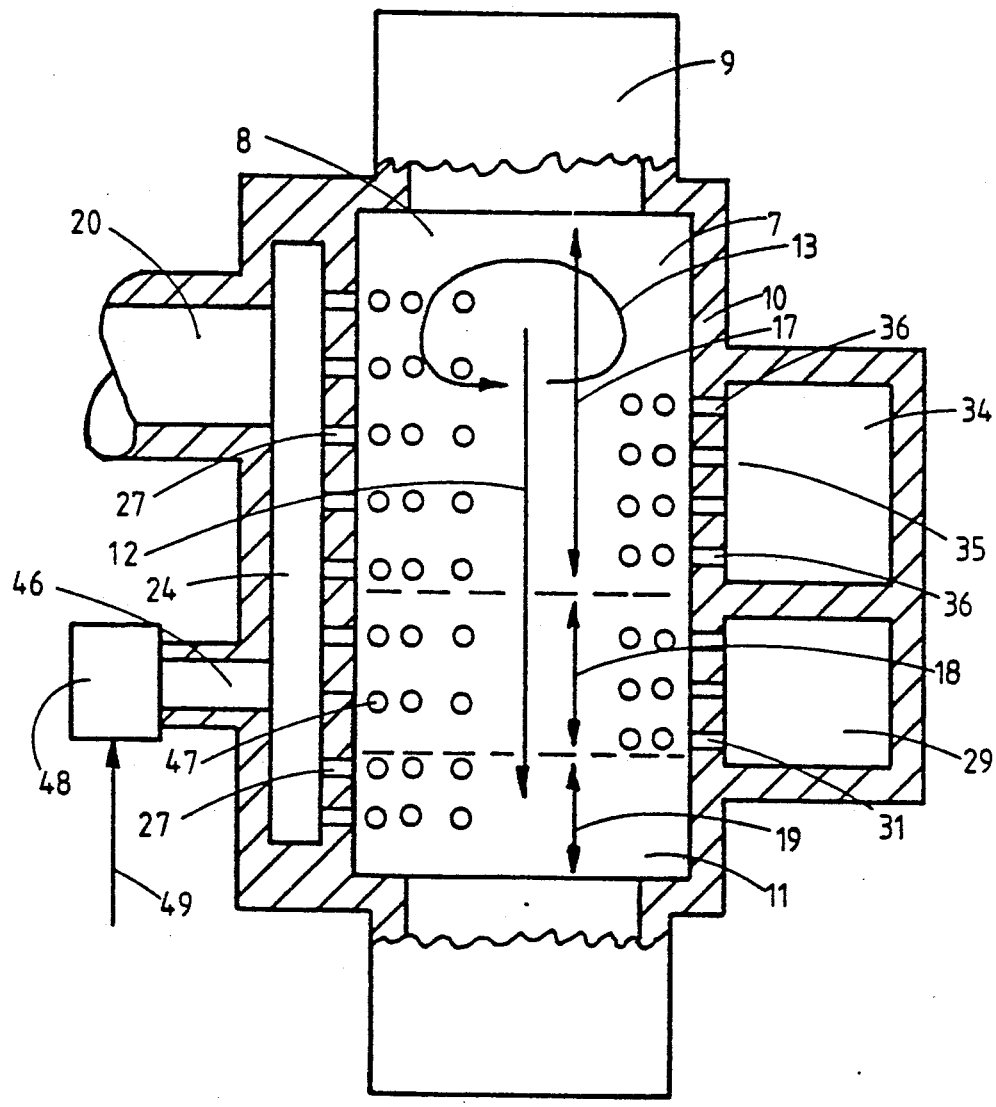
FIG. 3 is second embodiment of the reaction chamber.

The FIG. 3 form of this invention operated in the same manner as described hereinabove for the FIG. 2 form of invention except that those air portions entering the char fuel preheat and volatile matter distillation zone, 17, are mixed with the emerging char fuel volatile matter to form a volatile matter in air mixture during compression. The volatile matter in air mixture flows in part across the zone, 17, and into the volatile matter in air mixture reservoir, 34, via the ports, 36, during the compression time interval and is stored therein. During expansion the volatile matter in air mixture flows out of the volatile matter in air reservoir, 34, across the preheat and distillation zone, 17, into the reactant gas manifold, 24, via the reactant gas ports, 27, and into the variable volume chamber, 3, via the gas flow connecting means, 20. In this way most of the volatile matter in air mixture is kept out of the rapid reaction zone and in consequence is not burned therein to carbon dioxide and water vapor. By thus preventing or reducing the full combustion of the volatile matter in air mixture, appreciable formation of slow reacting carbon dioxide and water vapor within the rapid reaction zone is prevented, and the ash fusion and klinker formation consequent upon the high temperatures resulting from such full combustion are prevented or reduced. These are further beneficial objects made available by use of the FIG. 3 form of this invention.

The use of a central inlet to the producer gas reservoir, as described hereinabove, could in principal also be used for the inlet to the volatile matter in air mixture reservoir. However such a central inlet within the volatile matter distillation and preheat zone might interfere with the char fuel refueling process and restrict adequate supply of char fuel into the rapid reaction zone beyond the volatile matter distillation and preheat zone.

Prior art, steady pressure, gas producers have also separated the volatile matter in air mixture from the rapid reaction zone as shown for example in the Westinghouse double zone gas producer. A description of this Westinghouse gas producer is presented in the book, *Gas Engines And Producers*, L. S. Marks and H. S. McDewell, American Technical Society, Chicago, 1919, on page 26 and 17 of the second, *Gas Producers* section therein.

Additional beneficial objects can be achieved by use of changeable gas flow connections between the primary reaction chamber and the variable volume chamber, in order to create a unidirectional flow, in whole or part, of the producer gas and the volatile matter in air mixture, instead of the fully reversed flow of these gases which occurs in the FIG. 2 and FIG. 3 forms of this invention as described hereinabove. One particular example of a unidirectional flow form of this invention is shown schematically in FIG. 4 and comprises:

1. The following elements are similar to those described hereinabove for the FIG. 3 form of this invention:

The separate primary reaction chamber, 7, with refuel end, 8, refuel mechanism, 9, pressure vessel container, 10, ash collection end, 11, char fuel motion direction, 12; gas flow connection, 20, to the variable volume chamber, 3; reactant gas manifold, 24, reactant gas ports, 27; producer gas reservoir, 29, producer gas ports, 31; volatile matter in air mixture reservoir, 34, with ports, 36.

2. A first separate producer gas changeable gas flow connection, 22, connects the producer gas reservoir, 29, to the variable volume chamber, 3, and comprises a unidirectional flow means, 38, which creates flow only from the reservoir, 29, into the variable volume chamber, 3.

3. Another second separate volatile matter in air changeable gas flow connection, 21, connects the volatile matter in air mixture reservoir, 34, to the variable volume chamber, 3, and comprises a unidirectional flow means, 37, which creates flow only from the reservoir, 34, into the variable volume chamber, 3.

4. A further third separate reactant gas changeable gas flow connection, 39, connects between the fixed open gas flow connection, 20, into the variable volume chamber, 3, and the inlet, 25, of the reactant gas manifold, 24, and comprises a unidirectional flow means, 40, which creates flow only from the variable volume chamber, 3, into the manifold, 24.

5. The changeable gas flow connections with unidirectional flow means, 37, 38, 40, further comprise means for opening and closing the changeable gas flow connections.

6. A control means is added, operative upon the means for opening and closing the changeable gas flow connections, and driven by the internal combustion engine mechanism so that:
   a. the reactant gas changeable gas flow connection, 40, is open during most of all compression process time intervals, and is closed during most of all expansion time intervals;
   b. the producer gas changeable gas flow connection, 38, is closed during most of all compression process time intervals and is open during most of all expansion time intervals;
   c. the volatile matter in air mixture changeable gas flow connection, 37, is closed during most of all compression process time intervals and is open during most of all expansion time intervals.

These changeable gas flow connections and drive means and control means thus function to create a unidirectional flow of gas from the variable volume chamber, 3, into the primary reactor, 7, the producer gas reservoir, 29, and the volatile matter in air mixture reservoir, 34, via changeable gas flow connection, 40, during compression. During expansion unidirectional flow is continued from the primary reactor, 7, the producer gas reservoir, 29, the volatile matter in air mixture reservoir, 34, into the variable volume chamber, 3, via the two separate changeable gas flow connections, 37, 38.

The unidirectional flow means, 37, 38, 40, of the changeable gas flow connections can be pressure actuated check valves wherein the pressure difference is the drive means and this pressure difference is controlled by the compression and expansion of the variable volume chamber, 3, driven by the internal combustion engine mechanism, 4. Alternatively mechanically driven valves can be used opened and closed by linkages from control cams driven by the internal combustion engine mechanism as is well known in the art of gas compressors and internal combustion engines.

For cyclic char burning engines we prefer to direct the volatile matter in air mixture into the variable volume chamber, 3, close to the igniter means, 33, since these volatile matter in air mixtures are generally more readily ignitable than the producer gas in air mixtures. For this purpose the changeable gas flow connection, 21, from the volatile matter in air mixture reservoir, 34, connects into the variable volume chamber, 3, adjacent to the igniter means, 33, as shown in FIG. 1. The changeable gas flow connection, 22, from the producer gas reservoir, 29, is preferably connected into the variable volume chamber, 3, next adjacent to where the volatile matter in air mixture connection, 21, is connected in. In this way the volatile matter in air mixture is readily ignited by the igniter means, 33, and the consequently burning volatile matter in air mixture then ignites the producer gas after it has adequately mixed with the secondary air in the variable volume chamber, 3. Prompt ignition and efficient secondary burning are thus achieved in the secondary reactor and these are among the beneficial objects made available by use of unidirectional flow means with this invention.

Various types of igniter means, 33, can be used, such as electric sparks, glow plugs, burning gas air jets, diesel engine type injectors using highly compression ignitable fuels, etc. as is well known in the art of ignition of combustible fuel in air mixtures.

Figure 4:
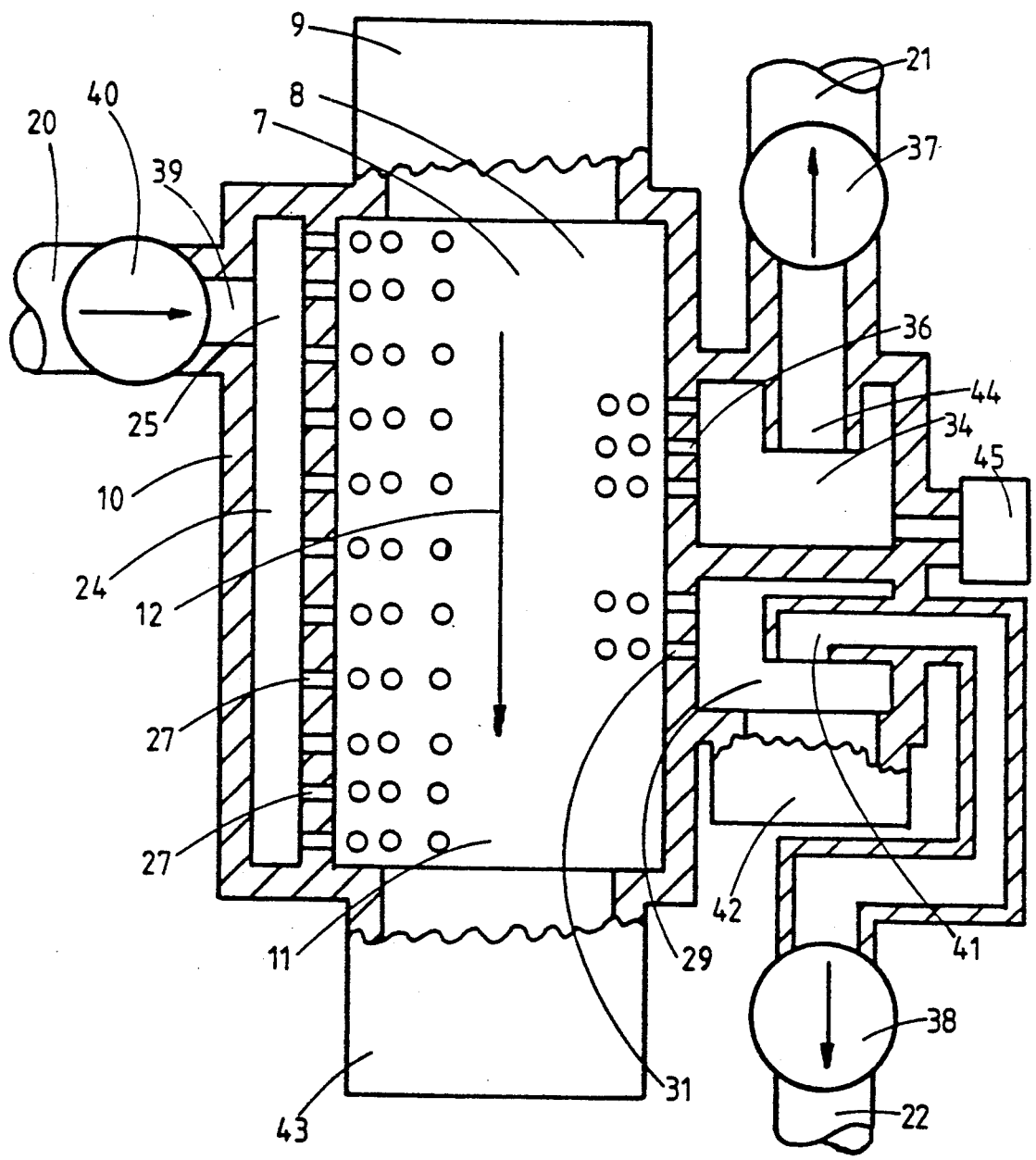
FIG. 4 is a third embodiment of the reaction chamber.

Wholly unidirectional gas flow is utilized in the form of this invention shown in FIG. 4. But partially unidirectional flow and partially reversed flow can be achieved by removing the unidirectional flow means, 40, from the reactant gas connecting means, 20, which then becomes a fixed open gas flow connection. During compression reactant gas flows, as before, into the primary reactor, 7, producer gas reservoir, 29, volatile matter in air mixture reservoir, 34, only via the reactant gas manifold, 24, from the variable volume chamber, 3, the changeable gas flow connections, 37, 38, being then closed. During expansion gas flows from the primary reactor, 7, the producer gas reservoir, 29, and the volatile matter in air mixture reservoir, 34, in part via the now open changeable gas flow connections, 37, 38, and in part via the reactant gas manifold, 24, and the fixed open gas flow connection, 20. This partially unidirectional flow and partially reversed flow form of this invention may be preferred when the cyclic char burning unit is a gasifier and the producer gas and volatile matter in air mixture are to be mixed together, as the final gasifier product, in the variable volume chamber. For this coal gasifier application the devices of this invention serve to reduce or prevent burnup of the volatile matter in air mixture within the primary reactor and in this way the final gasifier product can be a richer fuel gas.

Char fuels vary greatly in the proportion of volatile matter they contain; fuels such as coke or anthracite containing little or no volatile matter, whereas fuels such as bituminous coal, wood, biomass, etc. may contain well in excess of fifty percent volatile matter by weight. Hence the ratio of the volume within which the volatile matter in air mixture is stored to the volume within which the producer gas is stored during compression is preferably different for different char fuels differing in volatile matter content. The optimum value of this volumes ratio is best determined experimentally for each char fuel in a running cyclic char burning engine or gasifier. Various criteria of optimization can be chosen. For example, in gasifier applications the product fuel gas energy content per unit volume could be maximized. For engine applications engine torque or efficiency could be maximized. An approximation of the best value for this volumes ratio can be estimated from the proximate and ultimate analyses of the char fuel corrected to an ash and moisture free basis (maf basis) and using the following relations:

$$(GVR) = (GR)\left(\frac{MWP}{MWVMA}\right)\left(\frac{TVMA}{TPR}\right)$$

Wherein:

$$(GVR) = \frac{\text{(Vol. of Volatile Matter Air Mixture)}}{\text{(Vol. of Producer Gas)}} = \frac{(VVMA)}{(VPR)}$$

(VVMA) = Volume of volatile matter in air mixture within its reservoir and within the preheat and distillation zone of the primary reactor at end of compression;

(VPR) = Volume of producer gas within its reservoir and within the rapid reaction zone of the primary reactor at end of compression;

$$(GR) = \frac{\text{(Mass of Volatile Matter Air Mixture)}}{\text{(Mass of Producer Gas)}}$$

-continued $$(GR) = \frac{12(n - F) + m + 16r + 4.76(29)\left(n - F + \frac{m}{4} - \frac{r}{2}\right)}{28F + 64s + (28)\left[3.76\left(\frac{F}{2} + s\right) + \frac{t}{2}\right]}$$

$$n = \frac{(C)(MWC)}{(12)(100)}$$

$$m = \frac{(H)(MWC)}{(100)}$$

$$r = \frac{(O)(MWC)}{(16)(100)}$$

$$s = \frac{(S)(MWC)}{(32)(100)}$$

$$t = \frac{(N)(MWC)}{(14)(100)}$$

(MWC) = Assumed char fuel molecular weight. Values of 1000 to 10000 can be used here with no effect on volumes ratio.

C = Wt. percent carbon by ultimate analysis of char fuel;

H = Wt. percent hydrogen by ultimate analysis of char fuel;

O = Wt. percent oxygen by ultimate analysis of char fuel;

S = Wt. percent sulfur by ultimate analysis of char fuel;

N = Wt. percent nitrogen by ultimate analysis of char fuel;

These molecular weights and weight percents are for a moisture and ash free char fuel (maf).

$$(F) = \frac{(FC)(MWC) - 32(s) - 14(t)}{12}$$

(FC) = Wt. fraction fixed carbon by proximate analysis (maf) of char fuel;

(MWP) = Average molecular weight of producer gas;

$$(MWP) = \frac{28F + 64s + 14t + 3.76\left(\frac{F}{2} + s\right)(28)}{F + s + \frac{t}{2} + 3.76\left(\frac{F}{2} + s\right)}$$

(MWVMA) = Average molecular weight of volatile matter in air mixture assuming a stoichiometric ratio;

$$(MWVMA) = \frac{138\left(n - F + \frac{m}{4} - \frac{r}{2}\right) + (12n - 12F + m + 16r)}{4.76\left(n - F + \frac{m}{4} - \frac{r}{2}\right) + \frac{12n - 12F + m + 16r}{(MWVM)}}$$

(MWVM) = Average molecular weight of the volatile matter. Values between 100 and 5000 can be used here with very little effect on the estimated volumes ratio.

(TVMA) = Average absolute temperature of the volatile matter in air mixture at maximum compression pressure;

(TPR) = Average absolute temperature of the producer gas at maximum compression pressure;

Accurate estimations of each of these two average temperatures is difficult at best. However the ratio of these two temperatures can be roughly approximated as about two thirds. Those factors, such as external heat transfer or compression ratio, affecting each of these temperatures roughly proportionately.

$$\frac{(TVMA)}{(TPR)} = 0.66 \text{ approximately}$$

Where a cyclic char burning engine or gasifier is to be used with various char fuels, differing in volatile matter content, the volume of one or both of the producer gas reservoir and the volatile matter in air mixture reservoir can be made adjustable, as by use of add on volumes, or by adjustable piston in cylinder volumes. Such adjustable reservoir volumes could also be used as a means for controlling engine or gasifier torque since the extent of char fuel reaction per cycle varies directly with the gas volume reacted.

Where the cyclic char burning unit is an engine the producer gas product is to be mixed with the necessary secondary air so that complete combustion of the producer gas can be obtained during expansion in the secondary reactor of the variable volume chamber. This required secondary air can be simply stored in the variable volume chamber during compression and will be available then during expansion for the burning of the producer gas. Such use of the secondary reactor as also a secondary air reservoir, while mechanically simple, requires proper and prompt mixing of secondary air and producer gas during expansion. The required secondary air can alternatively be stored in whole or part in a reactant gas reservoir, such as are described in U.S. Pat. No. 4,794,729 and incorporated herein by reference, and the desired prompt and proper mixing of secondary air with producer gas during expansion can be more readily obtained with such separate reactant gas reservoirs.

For prior art cyclic char burning engines and gasifiers ash removal mechanism, 43, means for removing ashes were used to remove ashes from the ash collection end, 11, of the primary reactor, 7, and this method can also be used for the present invention. Alternatively, or additionally, ashes can be carried over from the ash collection end, 11, into the producer gas reservoir, 29, and there separated from the gas and then removed from the producer gas reservoir. For this purpose the producer gas ports, 31, are made larger in cross section than the ash particles, a separator means, 41, for separating particles from the producer gas is placed in the producer gas reservoir, 29, and an ash removal mechanism, 42, is installed on the producer gas reservoir, 29, as shown schematically in FIG. 4. Various types of gas solid separators can be used as the separator means, 41, such as cyclone separators or other centrifugal force separators. It is simpler to remove ashes from the producer gas reservoir since whatever particles are collected there can be removed without fear of removing any reactable char fuel from the primary reaction chamber. The ash removal mechanism, 43, which removes ashes from the ash collection end, 11, of the primary reactor, 7, needs to be controlled so that only ashes and not char fuel are removed. In similar fashion a separator means, 44, for separating solid or liquid particles from the gaseous volatile matter in air mixture, can be installed in the volatile matter in air mixture reservoir, 34, together with an ash removal mechanism, 45, means for removing solid and liquid particles, liquid tars are the principal material separated from the volatile matter in air mixture and a liquid drain valve is one form of ash removal mechanism, 45, suitable for use here.

A richer producer gas of higher volumetric heating value can be created by admitting steam into the rapid reaction zone where the producer gas is formed. This reaction of steam with hot carbon to form additional carbon monoxide and hydrogen fuels is endothermic and can thus also be used to prevent excessively high temperatures in the rapid reaction zone. We wish to thusly limit rapid reaction zone temperature in order to minimize ceramic liner durability problems and also ash fusion and klinker problems. But we only want steam into the rapid reaction zone. One scheme for accomplishing this preferred steam admission is shown schematically in FIG. 3 and comprises:

1. A steam admission connection, 46, into the reactant gas manifold, 24, adjacent to those reactant gas ports, 47, which connect into the rapid reaction zone, 18, and the ash zone, 19, of the primary reaction chamber, 7;
2. A steam admission controller, 48, which admits steam into the connection, 46, from a high pressure steam source, 49, only during compression process time intervals; the controller, 48, also limits the mass ratio of steam to air entering the rapid reaction zone, 18, to values preferably averaging less than about 0.22, in order to avoid excessive chilling of the rapid reaction zone;
3. Examples of suitable steam sources and steam admission controllers are described in my U.S. Pat. No. 4,333,423, issued June 8, 1982, entitled, *Engine Steam Stratifier*, and this material is incorporated herein by reference thereto.

Having thus described my invention what I claim is:

1. In a cyclic char burning power reactor comprising: at least one combined means for compressing and expanding gases, each said combined means comprising; an internal combustion engine mechanism comprising a variable volume chamber for compressing and expanding gases, and drive means for driving said internal combustion engine mechanism and for varying the volume of said chamber through repeated cycles, each cycle comprising a compression time interval followed by an expansion time interval, each said combined means for compressing and expanding further comprising, intake means for admitting reactant gases into said variable volume chamber prior to each said compression time interval, exhaust means for removing reacted gases from said variable volume chamber after each said expansion time interval; each said combined means for compressing and expanding being connected to a separate primary reaction chamber, within a pressure vessel container, each said primary reaction chamber comprising; a refuel end with a refuel mechanism means for supplying fresh char fuel particles into said refuel end, an ash collection end, a char fuel direction of motion from said refuel end toward said ash removal end, a peripheral dimension around the outer surface of said primary reaction chamber at right angles to said char fuel motion direction, each said primary reaction chamber further comprising, a volatile matter distillation and fuel preheat zone positioned toward said refuel end of said primary reaction chamber, an ash collection zone positioned toward said ash collection end of said primary reaction chamber, and a rapid reaction zone positioned between said volatile matter distillation and fuel preheat zone and said ash collection zone, each said primary reaction chamber further comprising at least one means for removing ashes; said char burning power reactor further comprising a source of supply of reactant gas containing appreciable oxygen gas to each said intake means for admitting reactant gases into said variable volume chamber; said char burning power reactor further comprising: means for preheating said char fuel within said primary reaction chamber to that temperature at which said char fuel reacts rapidly with oxygen in adjacent compressed reactant gases when said char burning power reactor is being started; means for cranking said internal combustion engine mechanism when said char burning power reactor is being started:

an improvement comprising:
 dividing said peripheral dimension of said primary reaction chamber into a separate inlet portion, a separate outlet portion, and a separate sealed portion;
 and adding to each said primary reaction chamber:
 a reactant gas manifold comprising an inlet and an outlet, said outlet connecting to reactant gas inlet ports into said primary reaction chamber, and these ports positioned along at least that portion of the length of said primary reaction chamber in said direction of char fuel motion, which is adjacent to said rapid reaction zone, and these ports also positioned around only said inlet portion of the periphery of said primary reaction chamber;
 a producer gas reservoir comprising an inlet, said inlet connecting to producer gas outlet ports out of said primary reaction chamber, and these ports positioned along that portion of said length of said primary reaction chamber along said direction of char fuel motion which is adjacent to said rapid reaction zone,
 wherein all of said reactant gas inlet ports and also all of said outlet ports are smaller in at least one area cross section dimension than the char fuel particles being refueled into said primary reaction chamber;
 a reactant fixed open gas flow connection from said variable volume chamber of said internal combustion engine mechanism to said inlet of said reactant gas manifold.

2. In a cyclic char burning power reactor as described in claim 1 and further comprising:
 a reactant changeable gas flow connection between said open gas flow connection from said variable volume chamber and said inlet of said reactant gas manifold and comprising means for opening and closing said reactant changeable gas flow connection;
 wherein said producer gas reservoir further comprises an outlet separate from said inlet;
 and further comprising:
 a separate producer gas changeable gas flow connection into said variable volume chamber of said internal combustion engine mechanism from said outlet of said producer gas reservoir and comprising means for opening and closing said changeable gas flow connection;
 control means, operative upon said means for opening and closing said changeable gas flow connections, and actuated in turn by said internal combustion engine mechanism of said cyclic char burning power reactor, for controlling the opening and closing of said changeable gas flow connections so that:

said reactant changeable gas flow connection is open during most of all compression process time intervals and is closed during most of all expansion time intervals of said connected variable volume chamber;

said separate producer gas changeable gas flow connection is closed during most of all compression process time intervals and is open during most of all expansion time intervals of said connected variable volume chamber.

3. In a cyclic char burning power reactor as described in claim 2 and further comprising:
a supply of steam;
steam means for delivering steam from said steam supply into said reactant gas manifold only during most of all compression process time intervals and adjacent to those reactant gas inlet ports into said rapid reaction zone.

4. In a cyclic char burning power reactor as described in claim 2, wherein:
said producer gas reservoir further comprises means for separating solid and liquid particles from said producer gas;
said ash removal mechanism means for removing ashes comprises means for removing collected solid and liquid materials from at least one of said ash collection end, said producer gas reservoir.

5. In a cyclic char burning power reactor as described in claim 2 wherein:
each said variable volume chamber of said internal combustion engine mechanism comprises a secondary reaction chamber and an igniter means for igniting fuel gas in air mixtures;
said producer gas changeable gas flow connection connects into said variable volume chamber adjacent to said igniter means therein.

6. In a cyclic char burning power reactor as described in claim 1 and further comprising:
a volatile matter in air mixture reservoir comprising an outlet and an inlet, said inlet connecting to volatile matter in air mixture outlet ports out of said primary reaction chamber, and these ports positioned along that portion of said length of said primary reaction chamber along said direction of char fuel motion which is adjacent to said volatile matter distillation zone, and these ports also positioned around only said outlet portion of the periphery of said primary reaction chamber; said volatile matter in air outlet ports being smaller in at least one area cross section dimension than the char fuel particles being refueled into said primary reaction chamber;
wherein said reactant gas inlet ports into said primary reaction chamber are positioned along at least that portion of the length of said primary reaction chamber in said direction of char fuel motion which is adjacent to said rapid reaction zone and said volatile matter distillation zone;
wherein said producer gas reservoir further comprises an outlet separate from said inlet;
and further comprising
a reactant changeable gas flow connection between said open gas flow connection from said variable volume chamber and said inlet of said reactant gas manifold and comprising means for opening and closing said reactant changeable gas flow connection;
a separate volatile matter in air changeable gas flow connection into said variable volume chamber of said internal combustion engine mechanism from said outlet of said volatile matter in air mixture reservoir and comprising means for opening and closing said changeable gas flow connection;
a separate producer gas changeable gas flow connection into said variable volume chamber of said internal combustion engine mechanism from said outlet of said producer gas reservoir and comprising means for opening and closing said changeable gas flow connection;
control means, operative upon said means for opening and closing said changeable gas flow connections, and actuated in turn by said internal combustion engine mechanism of said cyclic char burning power reactor for controlling the opening and closing of said changeable gas flow connections so that:

said reactant changeable gas flow connection is open during most of all compression process time intervals and is closed during most of all expansion time intervals of said connected variable volume chamber;

said separate producer gas changeable gas flow connection is closed during most of all compression process time intervals and is open during most of all expansion time intervals of said connected variable volume chamber;

said separate volatile matter in air changeable gas flow connection is closed during most of all compression process time intervals and is open during most of all expansion time intervals of said connected variable volume chamber.

7. In a cyclic char burning power reactor as described in claim 6 wherein:
each said variable volume chamber of said internal combustion engine mechanism comprises a secondary reaction chamber and an igniter means for igniting fuel gas in air mixtures;
said volatile matter in air changeable gas flow connection connects into said variable volume chamber adjacent to said igniter means therein;
said producer gas changeable gas flow connection connects into said variable volume chamber adjacent to where said volatile matter in air changeable gas flow connection connects into said variable volume chamber.

8. In a cyclic char burning power reactor as described in claim 1 and further comprising:
a volatile matter in air mixture reservoir comprising an inlet, said inlet connecting to volatile matter in air mixture outlet ports out of said primary reaction chamber, and these ports positioned along that portion of said length of said primary reaction chamber along said direction of char fuel motion which is adjacent to said volatile matter distillation zone, and these ports are positioned around only said outlet portion of the periphery of said primary reaction chamber; said volatile matter in air outlet ports being smaller in at least one area cross section dimension than the char fuel particles being refuelled into said primary reaction chamber;

wherein said reactant gas inlet ports into said primary reaction chamber are positioned along at least that portion of the length of said primary reaction chamber in said direction of char fuel motion which is adjacent to said rapid reaction zone and said volatile matter distillation zone.

9. In a cyclic char burning power reactor as described in claim 8
wherein each said variable volume chamber of said internal combustion engine mechanism comprises a secondary reaction chamber and an igniter means for igniting fuel gas in air mixtures.

10. In a cyclic char burning power reactor as described in claim 8
wherein said producer gas reservoir further comprises an outlet separate from said inlet;
wherein said volatile matter in air mixture reservoir further comprises an outlet separate from said inlet;
and further comprising:
a separate producer gas changeable gas flow connection into said variable volume chamber of said internal combustion engine mechanism from said outlet of said producer gas reservoir and comprising means for opening and closing said changeable gas flow connection;
a separate volatile matter in air changeable gas flow connection into said variable volume chamber of said internal combustion engine mechanism from said outlet of said volatile matter in air mixture reservoir and comprising means for opening and closing said changeable gas flow connection;
control means operative upon said means for opening and closing said changeable gas flow connections, and actuated in turn by said internal combustion engine mechanism of said cyclic char burning power reactor for controlling the opening and closing of said changeable gas flow connections so that:
said separate producer gas changeable gas flow connection is closed during most of all compression process time intervals and is open during most of all expansion time intervals of said connected variable volume chamber;
said separate volatile matter in air changeable gas flow connection is closed during most of all compression process time intervals and is open during most of all expansion time intervals of said connected variable volume chamber.

11. In a cyclic char burning power reactor as described in claim 1:
wherein said inlet of said producer gas reservoir is positioned approximately radially central within said ash collection zone and said rapid reaction zone;
wherein said producer gas outlet ports are positioned, along the length of said primary reaction chamber, in said direction of char fuel motion, which is adjacent to said rapid reaction zone, and approximately angularly uniformly around the periphery of said producer gas reservoir inlet at right angles to said char fuel motion direction;
wherein said separate inlet portion of the peripheral dimension of said primary reactor encompasses essentially the full periphery for those reactant gas inlet ports positioned adjacent to said rapid reaction zone.

12. In a cyclic char burning power reactor as described in claim 11 and further comprising:
a reactant changeable gas flow connection between said open gas flow connection from said variable volume chamber and said inlet of said reactant gas manifold and comprising means for opening and closing said reactant changeable gas flow connection;
wherein said producer gas reservoir further comprises an outlet separate from said inlet;
and further comprising:
a separate producer gas changeable gas flow connection into said variable volume chamber of said internal combustion engine mechanism from said outlet of said producer gas reservoir and comprising means for opening and closing said changeable gas flow connection;
control means, operative upon said means for opening and closing said changeable gas flow connections, and actuated in turn by said internal combustion engine mechanism of said cyclic char burning power reactor, for controlling the opening and closing of said changeable gas flow connections so that:
said reactant changeable gas flow connection is open during most of all compression process time intervals and is closed during most of all expansion time intervals of said connected variable volume chamber;
said separate producer gas changeable gas flow connection is closed during most of all compression process time intervals and is open during most of all expansion time intervals of said connected variable volume chamber.

13. In a cyclic char burning power reactor as described in claim 11 and further comprising:
a volatile matter in air mixture reservoir comprising an outlet and an inlet, said inlet connecting to volatile matter in air mixture outlet ports out of said primary reaction chamber, and these ports positioned along that portion of said length of said primary reaction chamber along said direction of char fuel motion which is adjacent to said volatile matter distillation zone, and these ports also positioned around only said outlet portion of the periphery of said primary reaction chamber; said volatile matter in air outlet ports being smaller in at least one area cross section dimension than the char fuel particles being refueled into said primary reaction chamber;
wherein said reactant gas inlet ports into said primary reaction chamber are positioned along at least that portion of the length of said primary reaction chamber in said direction of char fuel motion which is adjacent to said rapid reaction zone and said volatile matter distillation zone;
wherein said producer gas reservoir further comprises an outlet separate from said inlet;
and further comprising
a reactant changeable gas flow connection between said open gas flow connection from said variable volume chamber and said inlet of said reactant gas manifold and comprising means for opening and closing said reactant changeable gas flow connection;
a separate volatile matter in air changeable gas flow connection into said variable volume chamber of said internal combustion engine mechanism from said outlet of said volatile matter in air mixture reservoir and comprising means for opening and closing said changeable gas flow connection;

a separate producer gas changeable gas flow connection into said variable volume chamber of said internal combustion engine mechanism from said outlet of said producer gas reservoir and comprising means for opening and closing said changeable gas flow connection;

control means, operative upon said means for opening and closing said changeable gas flow connections, and actuated in turn by said internal combustion engine mechanism of said cyclic char burning power reactor for controlling the opening and closing of said changeable gas flow connections so that:

said reactant changeable gas flow connection is open during most of all compression process time intervals and is closed during most of all expansion time intervals of said connected variable volume chamber;

said separate producer gas changeable gas flow connection is closed during most of all compression process time intervals and is open during most of all expansion time intervals of said connected variable volume chamber;

said separate volatile matter in air changeable gas flow connection is closed during most of all compression process time intervals and is open during most of all expansion time intervals of said connected variable volume chamber.

14. In a cyclic char burning power reactor as described in claim 11 and further comprising:

a volatile matter in air mixture reservoir comprising an inlet, said inlet connecting to volatile matter in air mixture outlet ports out of said primary reaction chamber, and these ports positioned along that portion of said length of said primary reaction chamber along said direction of char fuel motion which is adjacent to said volatile matter distillation zone, and these ports also positioned around only said outlet portion of the periphery of said primary reaction chamber; said volatile matter in air outlet ports being smaller in at least one area cross section dimension than the char fuel particles being refueled into said primary reaction chamber;

wherein said reactant gas inlet ports into said primary reaction chamber are positioned along at least that portion of the length of said primary reaction chamber in said direction of char fuel motion which is adjacent to said rapid reaction zone and said volatile matter distillation zone.

15. In a cyclic char burning engine as described in claim 11, wherein:

said producer gas reservoir further comprises means for separating solid and liquid particles from said producer gas;

said ash removal mechanism means for removing ashes comprises means for removing collected solid and liquid materials from at least one of said ash collection end, said producer gas reservoir.

16. In a cyclic char burning power reactor as described in claim 1:

wherein said producer gas outlet ports are positioned around only said outlet portion of the periphery of said primary reaction chamber.

17. In a cyclic char burning power reactor as described in claim 16 and further comprising:

a reactant changeable gas flow connection between said open gas flow connection from said variable volume chamber and said inlet of said reactant gas manifold and comprising means for opening and closing said reactant changeable gas flow connection;

wherein said producer gas reservoir further comprises an outlet separate from said inlet;

and further comprising:

a separate producer gas changeable gas flow connection into said variable volume chamber of said internal combustion engine mechanism from said outlet of said producer gas reservoir and comprising means for opening and closing said changeable gas flow connection;

control means, operative upon said means for opening and closing said changeable gas flow connections, and actuated in turn by said internal combustion engine mechanism of said cyclic char burning power reactor, for controlling the opening and closing of said changeable gas flow connections so that:

said reactant changeable gas flow connection is open during most of all compression process time intervals and is closed during most of all expansion time intervals of said connected variable volume chamber;

said separate producer gas changeable gas flow connection is closed during most of all compression process time intervals and is open during most of all expansion time intervals of said connected variable volume chamber.

18. In a cyclic char burning power reactor as described in claim 16 and further comprising:

a volatile matter in air mixture reservoir comprising an outlet and an inlet, said inlet connecting to volatile matter in air mixture outlet ports out of said primary reaction chamber, and these ports positioned along that portion of said length of said primary reaction chamber along said direction of char fuel motion which is adjacent to said volatile matter distillation zone, and these ports also positioned around only said outlet portion of the periphery of said primary reaction chamber; said volatile matter in air outlet ports being smaller in at least one area cross section dimension than the char fuel particles being refueled into said primary reaction chamber;

wherein said reactant gas inlet ports into said primary reaction chamber are positioned along at least that portion of the length of said primary reaction chamber in said direction of char fuel motion which is adjacent to said rapid reaction zone and said volatile matter distillation zone;

wherein said producer gas reservoir further comprises an outlet separate from said inlet;

and further comprising:

a reactant changeable gas flow connection between said open gas flow connection from said variable volume chamber and said inlet of said reactant gas manifold and comprising means for opening and closing said reactant changeable gas flow connection;

a separate volatile matter in air changeable gas flow connection into said variable volume chamber of said internal combustion engine mechanism from said outlet of said volatile matter in air mixture reservoir and comprising means for opening and closing said changeable gas flow connection;

a separate producer gas changeable gas flow connection into said variable volume chamber of said internal combustion engine mechanism from said outlet of said producer gas reservoir and comprising means for opening and closing said changeable gas flow connection;

control means, operative upon said means for opening and closing said changeable gas flow connections, and actuated in turn by said internal combustion engine mechanism of said cyclic char burning power reactor for controlling the opening and closing of said changeable gas flow connections so that:

said reactant changeable gas flow connection is open during most of all compression process time intervals and is closed during most of all expansion time intervals of said connected variable volume chamber;

said separate producer gas changeable gas flow connection is closed during most of all compression process time intervals and is open during most of all expansion time intervals of said connected variable volume chamber;

said separate volatile matter in air changeable gas flow connection is closed during most of all compression process time intervals and is open during most of all expansion time intervals of said connected variable volume chamber.

19. In a cyclic char burning power reactor as described in claim 16 and further comprising:

a volatile matter in air mixture reservoir comprising an inlet, said inlet connecting to volatile matter in air mixture outlet ports out of said primary reaction chamber, and these ports positioned along that portion of said length of said primary reaction chamber along said direction of char fuel motion which is adjacent to said volatile matter distillation zone, and these ports also positioned around only said outlet portion of the periphery of said primary reaction chamber; said volatile matter in air outlet ports being smaller in at least one area cross section dimension than the char fuel particles being refuelled into said primary reaction chamber;

wherein said reactant gas inlet ports into said primary reaction chamber are positioned along at least that portion of the length of said primary reaction chamber in said direction of char fuel motion which is adjacent to said rapid reaction zone and said volatile matter distillation zone.

20. In a cyclic char burning power reactor as described in claim 1:

wherein said reactant gas inlet ports are also positioned along that portion of the length of said primary reaction chamber, in said direction of char fuel motion, which is adjacent to said ash collection zone and said volatile matter distillation zone.

21. In a cyclic char burning power reactor as described in claim 20 and further comprising:

a reactant changeable gas flow connection between said open gas flow connection from said variable volume chamber and said inlet of said reactant gas manifold and comprising means for opening and closing said reactant changeable gas flow connection;

wherein said producer gas reservoir further comprises an outlet separate from said inlet;

and further comprising:

a separate producer gas changeable gas flow connection into said variable volume chamber of said internal combustion engine mechanism from said outlet of said producer gas reservoir and comprising means for opening and closing said changeable gas flow connection;

control means, operative upon said means for opening and closing said changeable gas flow connections, and actuated in turn by said internal combustion engine mechanism of said cyclic char burning power reactor, for controlling the opening and closing of said changeable gas flow connections so that:

said reactant changeable gas flow connection is open during most of all compression process time intervals and is closed during most of all expansion time intervals of said connected variable volume chamber;

said separate producer gas changeable gas flow connection is closed during most of all compression process time intervals and is open during most of all expansion time intervals of said connected variable volume chamber.

22. In a cyclic char burning power reactor as described in claim 20 and further comprising:

a volatile matter in air mixture reservoir comprising an outlet and an inlet, said inlet connecting to volatile matter in air mixture outlet ports out of said primary reaction chamber, and these ports positioned along that portion of said length of said primary reaction chamber along said direction of char fuel motion which is adjacent to said volatile matter distillation zone, and these ports also positioned around only said outlet portion of the periphery of said primary reaction chamber; said volatile matter in air outlet ports being smaller in at least one area cross section dimension than the char fuel particles being refueled into said primary reaction chamber;

wherein said reactant gas inlet ports into said primary reaction chamber are positioned along at least that portion of the length of said primary reaction chamber in said direction of char fuel motion which is adjacent to said rapid reaction zone and said volatile matter distillation zone;

wherein said producer gas reservoir further comprises an outlet separate from said inlet;

and further comprising:

a reactant changeable gas flow connection between said open gas flow connection from said variable volume chamber and said inlet of said reactant gas manifold and comprising means for opening and closing said reactant changeable gas flow connection;

a separate volatile matter in air changeable gas flow connection into said variable volume chamber of said internal combustion engine mechanism from said outlet of said volatile matter in air mixture reservoir and comprising means for opening and closing said changeable gas flow connection;

a separate producer gas changeable gas flow connection into said variable volume chamber of said internal combustion engine mechanism from said outlet of said producer gas reservoir and comprising means for opening and closing said changeable gas flow connection;

control means, operative upon said means for opening and closing said changeable gas flow connections, and actuated in turn by said internal combustion engine mechanism of said cyclic char burning power reactor for controlling the opening and closing of said changeable gas flow connections so that:

said reactant changeable gas flow connection is open during most of all compression process time intervals and is closed during most of all expansion time intervals of said connected variable volume chamber;

said separate producer gas changeable gas flow connection is closed during most of all compression process time intervals and is open during most of all expansion time intervals of said connected variable volume chamber;

said separate volatile matter in air changeable gas flow connection is closed during most of all compression process time intervals and is open during most of all expansion time intervals of said connected variable volume chamber.

23. In a cyclic char burning power reactor as described in claim 20 and further comprising:

a volatile matter in air mixture reservoir comprising an outlet and an inlet, said inlet connecting to volatile matter in air mixture outlet ports out of said primary reaction chamber, and these ports positioned along that portion of said length of said primary reaction chamber along said direction of char fuel motion which is adjacent to said volatile matter distillation zone, and these ports also positioned around only said outlet portion of the periphery of said primary reaction chamber; said volatile matter in air outlet ports being smaller in at least one area cross section dimension than the char fuel particles being refueled into said primary reaction chamber;

wherein said reactant gas inlet ports into said primary reaction chamber are positioned along at least that portion of the length of said primary reaction chamber in said direction of char fuel motion which is adjacent to said rapid reaction zone and said volatile matter distillation zone.

24. In a cyclic char burning power reactor as described in claim 1 and further comprising:

a supply of steam;

steam means for delivering steam from said steam supply into said reactant gas manifold only during most of all compression process time intervals and adjacent to those reactant gas inlet ports into said rapid reaction zone.

25. In a cyclic char burning power reactor as described in claim 1, wherein:

said producer gas reservoir further comprises means for separating solid and liquid particles from said producer gas;

said ash removal mechanism means for removing ashes comprises means for removing collected solid and liquid materials from at least one of said ash collection end, said producer gas reservoir.

26. In a cyclic char burning power reactor as described in claim 1 wherein each said variable volume chamber of said internal combustion engine mechanism comprises a secondary reaction chamber and an igniter means for igniting fuel gas in air mixtures.

27. In a cyclic char burning power reactor as described in claim 1 wherein said producer gas reservoir further comprises an outlet separate from said inlet;

and further comprising:

a separate producer gas changeable gas flow connection into said variable volume chamber of said internal combustion engine mechanism from said outlet of said producer gas reservoir and comprising means for opening and closing said changeable gas flow connection;

control means, operative upon said means for opening and closing said changeable gas flow connections, and actuated in turn by said internal combustion engine mechanism of said cyclic char burning power reactor, for controlling the opening and closing of said changeable gas flow connections so that:

said separate producer gas changeable gas flow connection is closed during most of all compression process time intervals and is open during most of all expansion time intervals of said connected variable volume chamber.

28. In a cyclic char burning power reactor comprising: at least one combined means for compressing and expanding gases, each said combined means comprising; an internal combustion engine mechanism comprising a variable volume chamber for compressing and expanding gases, and drive means for driving said internal combustion engine mechanism and for varying the volume of said chamber through repeated cycles, each cycle comprising a compression time interval followed by an expansion time interval, each said combined means for compressing and expanding further comprising, intake means for admitting reactant gases into said variable volume chamber prior to each said compression time interval, exhaust means for removing reacted gases from said variable volume chamber after each said expansion time interval; each said combined means for compressing and expanding being connected to a separate primary reaction chamber, within a pressure vessel container, each said primary reaction chamber comprising; a refuel end with a refuel mechanism means for supplying fresh char fuel particles into said refuel end, an ash collection end, a char fuel direction of motion from said refuel end toward said ash removal end, a peripheral dimension around the outer surface of said primary reaction chamber at right angles to said char fuel motion direction, each said primary reaction chamber further comprising, a volatile matter distillation and fuel preheat zone positioned toward said refuel end of said primary reaction chamber, an ash collection zone positioned toward said ash collection end of said primary reaction chamber, and a rapid reaction zone positioned between said volatile matter distillation and fuel preheat zone and said ash collection zone, each said primary reaction chamber further comprising at least one means for removing ashes; said char burning power reactor further comprising a source of supply of reactant gas containing appreciable oxygen gas to each said intake means for admitting reactant gases into said variable volume chamber; said char burning power reactor further comprising: means for preheating said char fuel within said primary reaction chamber to that temperature at which said char fuel reacts rapidly with oxygen in adjacent compressed reactant gases when said char burning power reactor is being started; means for cranking said internal combustion engine mechanism when said char burning power reactor is being started:

an improvement comprising:

dividing said peripheral dimension of said primary reaction chamber into a separate inlet portion, a separate outlet portion, and a separate sealed portion;

and adding to each said primary reaction chamber:

a reactant gas manifold comprising an inlet and an outlet, said outlet connecting to reactant gas inlet ports into said primary reaction chamber, and these ports positioned along at least that portion of the length of said primary reaction chamber in said direction of char fuel motion which is adjacent to said volatile matter distillation zone, and these ports also positioned around only said inlet portion of the periphery of said primary reaction chamber;

a producer gas reservoir comprising an inlet, said inlet connecting to producer gas outlet ports out of said primary reaction chamber, said inlet of said producer gas reservoir is positioned approximately radially central within said ash collection zone and said rapid reaction zone, said producer gas outlet ports are positioned, along the length of said primary reaction chamber, in said direction of char fuel motion, which is adjacent to said rapid reaction zone, and approximately angularly uniformly around the periphery of said producer gas reservoir inlet at right angles to said char fuel motion direction;

wherein all of said reactant gas inlet ports and also all of said outlet ports are smaller in at least one area cross section dimension than the char fuel particles being refueled into said primary reaction chamber;

a reactant fixed open gas flow connection from said variable volume chamber of said internal combustion engine mechanism to said inlet of said reactant gas manifold.

29. In a cyclic char burning power reactor as described in claim 28 and further comprising:

a reactant changeable gas flow connection between said open gas flow connection from said variable volume chamber and said inlet of said reactant gas manifold and comprising means for opening and closing said reactant changeable gas flow connection;

wherein said producer gas reservoir further comprises an outlet separate from said inlet;

and further comprising;

a separate producer gas changeable gas flow connection into said variable volume chamber of said internal combustion engine mechanism from said outlet of said producer gas reservoir and comprising means for opening and closing said changeable gas flow connection;

control means, operative upon said means for opening and closing said changeable gas flow connections, and actuated in turn by said internal combustion engine mechanism of said cyclic char burning power reactor, for controlling the opening and closing of said changeable gas flow connections so that:

said reactant changeable gas flow connection is open during most of all compression process time intervals and is closed during most of all expansion time intervals of said connected variable volume chamber;

said separate producer gas changeable gas flow connection is closed during most of all compression process time intervals and is open during most of all expansion time intervals of said connected variable volume chamber.

30. In a cyclic char burning power reactor as described in claim 28 and further comprising:

a volatile matter in air mixture reservoir comprising an outlet and an inlet, said inlet connecting to volatile matter in air mixture outlet ports out of said primary reaction chamber, and these ports positioned along that portion of said length of said primary reaction chamber along said direction of char fuel motion which is adjacent to said volatile matter distillation zone, and these ports also positioned around only said outlet portion of the periphery of said primary reaction chamber; said volatile matter in air outlet ports being smaller in at least one area cross section dimension than the char fuel particles being refueled into said primary reaction chamber:

wherein said producer gas reservoir further comprises an outlet separate from said inlet;

and further comprising a reactant changeable gas flow connection between said open gas flow connection from said variable volume chamber and said inlet of said reactant gas manifold and comprising means for opening and closing said reactant changeable gas flow connection;

a separate volatile matter in air changeable gas flow connection into said variable volume chamber of said internal combustion engine mechanism from said outlet of said volatile matter in air mixture reservoir and comprising means for opening and closing said changeable gas flow connection;

a separate producer gas changeable gas flow connection into said variable volume chamber of said internal combustion engine mechanism from said outlet of said producer gas reservoir and comprising means for opening and closing said changeable gas flow connection;

control means, operative upon said means for opening and closing said changeable gas flow connections, and actuated in turn by said internal combustion engine mechanism of said cyclic char burning power reactor for controlling the opening and closing of said changeable gas flow connections so that:

said reactant changeable gas flow connection is open during most of all compression process time intervals and is closed during most of all expansion time intervals of said connected variable volume chamber;

said separate producer gas changeable gas flow connection is closed during most of all compression process time intervals and is open during most of all expansion time intervals of said connected variable volume chamber;

said separate volatile matter in air changeable gas flow connection is closed during most of all compression process time intervals and is open during most of all expansion time intervals of said connected variable volume chamber.

31. In a cyclic char burning power reactor as described in claim 28 and further comprising:

a volatile matter in air mixture reservoir comprising an inlet, said inlet connecting to volatile matter in air mixture outlet ports out of said primary reaction chamber, and these ports positioned along that portion of said length of said primary reaction chamber along said direction of char fuel motion which is adjacent to said volatile matter distillation zone, and these ports also positioned around only said outlet portion of the periphery of said primary reaction chamber; said volatile matter in air outlet ports being smaller in at least one area cross section dimension than the char fuel particles being refueled into said primary reaction chamber.

* * * * *